A. LOEWENBERG.
METER FOR MEASURING ELECTRICAL CURRENTS.
APPLICATION FILED MAR. 22, 1909.

1,020,565.

Patented Mar. 19, 1912.

Witnesses
A. E. Schulz
H. M. Stuart

Inventor
Alfred Loewenberg
By Joseph G. Parkinson
Attorney

A. LOEWENBERG.
METER FOR MEASURING ELECTRICAL CURRENTS.
APPLICATION FILED MAR. 22, 1909.
1,020,565.
Patented Mar. 19, 1912.
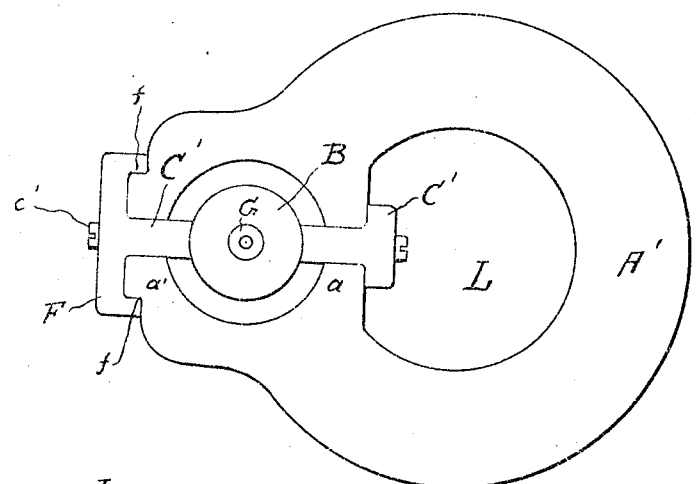
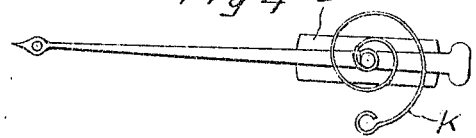
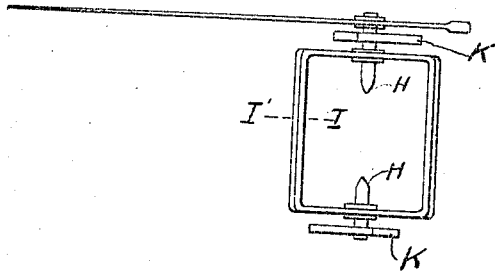
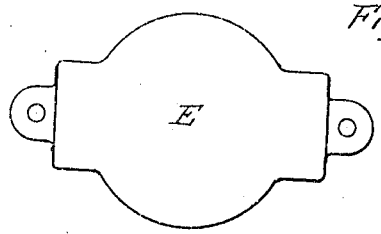

A. LOEWENBERG.
METER FOR MEASURING ELECTRICAL CURRENTS.
APPLICATION FILED MAR. 22, 1909.

1,020,565.

Patented Mar. 19, 1912.

3 SHEETS—SHEET 3.

Witnesses:
Chas. E. Gorton
Ernest Langly

Inventor:
Alfred Loewenberg,
By Joseph G. Parkinson
Atty

UNITED STATES PATENT OFFICE.

ALFRED LOEWENBERG, OF CHICAGO, ILLINOIS.

METER FOR MEASURING ELECTRICAL CURRENTS.

1,020,565.  Specification of Letters Patent.  Patented Mar. 19, 1912.

Application filed March 22, 1909. Serial No. 484,846.

*To all whom it may concern:*

Be it known that I, ALFRED LOEWENBERG, a citizen of the United States, residing at Chicago, in the county of Cook and State of Illinois, have invented certain new and useful Improvements in Meters for Measuring Electrical Currents, of which the following is a specification.

My invention relates to measuring instruments of the D'Arsonval type, where a coil moves in a permanent magnetic field. A leading fault in these devices, as now constructed, is in the number of joints in the assembled magnet, the pole shoes or field-pieces being separated from the permanent magnet and joined thereto by screws or like means, a magnetic lag being caused wherever a joint or screw is found. I overcome this fault or defect by making the magnet and field pieces integral, whether solid or laminated, so that no joint or fastening screw exists between magnet proper and field-pieces. I also prefer to avoid the formation of holes or placing of screws in any part of magnet or field-pieces, to cause loss of magnetic force; all as will be understood from the ensuing description and reference to the accompanying drawings, in which latter—

Figure 1:
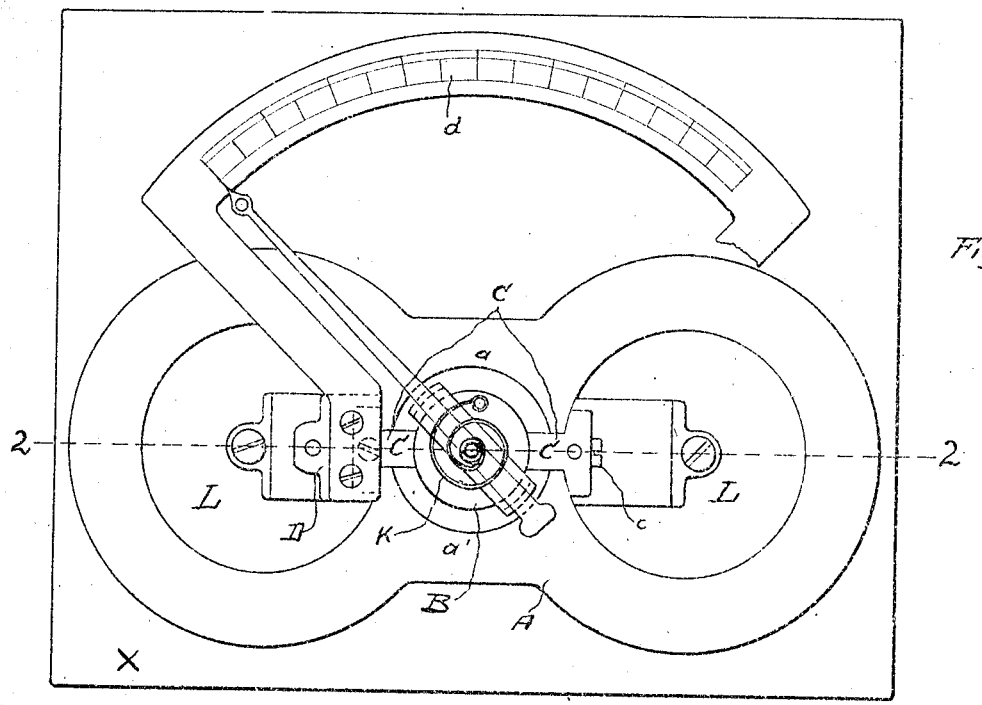
Figure 2:
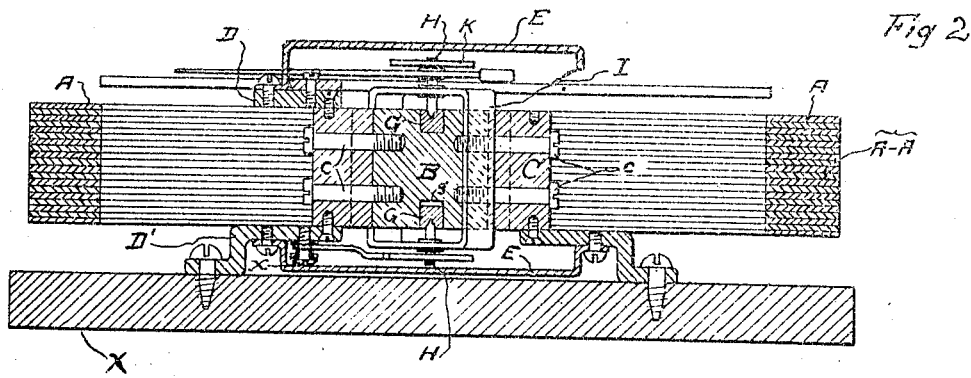
Figure 8:
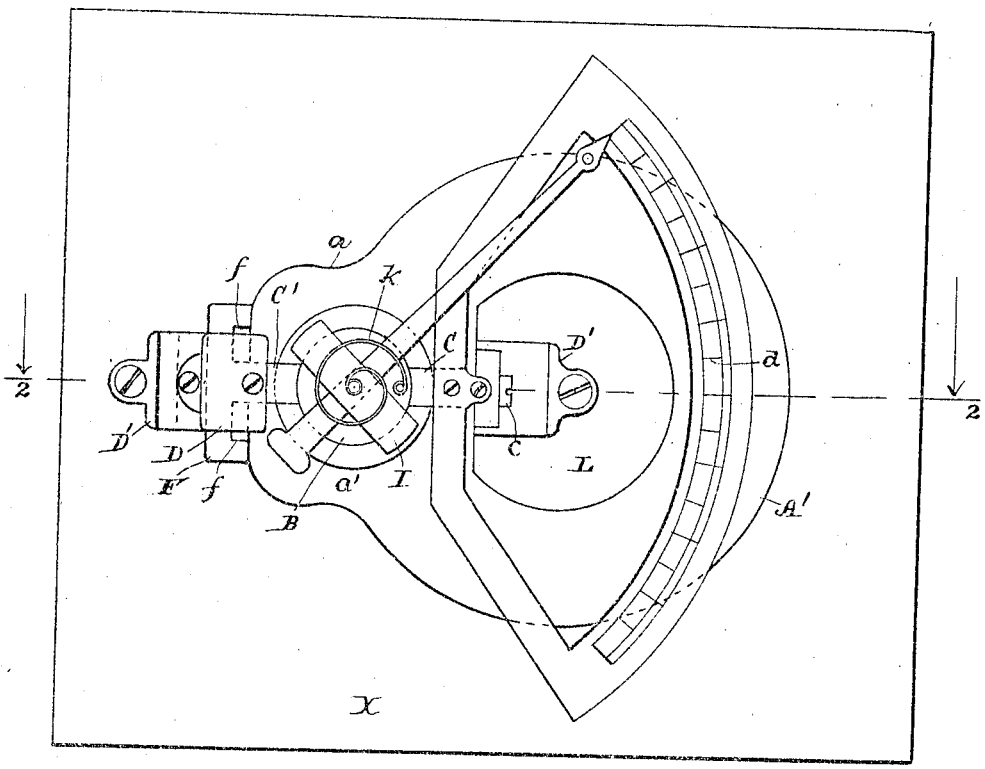

Figure 1 is a front elevation of a completed meter embodying one form of my invention, with dial partly broken away and outer cap removed to expose the relations of the mechanism; Fig. 2, a horizontal section through said meter on the correspondingly numbered line in the preceding figure, showing the magnet and field-pieces as laminated and illustrating the manner of mounting and centering the soft iron core between the field-pieces; Fig. 3, an alternative form of magnet and field-pieces, herein selected as the specific form, showing also the method of mounting the core therein and preventing the poles from springing apart; Fig. 4, an end elevation of the oscillatory coil or movable element, with spiral hair springs and pointer or indicator; Fig. 5, a plan view of said coil, showing the hair springs and the inwardly projecting pivots to engage the jewels mounted axially in the ends of the soft iron core, and also showing the pointer; Figs. 6 and 7, respectively, plan and elevation of the non-magnetic cap which covers core and coil and excludes dirt and iron dust from them and from the field-pieces. Fig. 8, a front elevation of a completed meter built on the lines of the magnet and accessories shown in Fig. 3, and Fig. 9, a horizontal section through said latter meter on the line 8—8 of the foregoing figure.

Figure 9:
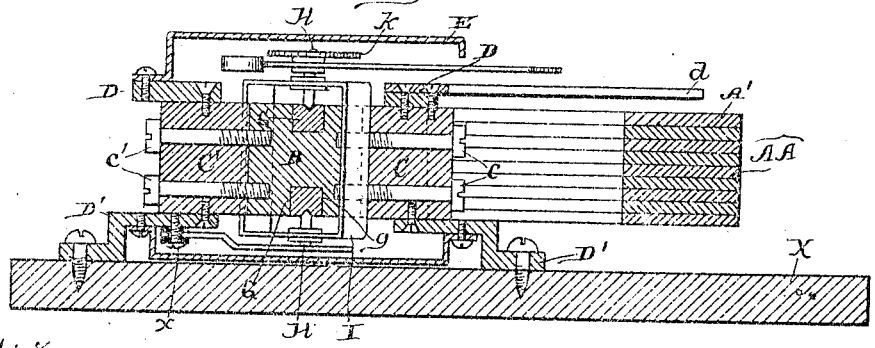

Referring now to said drawings, A, in Figs. 1 and 2, represents what may be described as a double horse-shoe magnet, and A', in Figs. 3, 8 and 9, one of single horse-shoe outline, each laminated integrally with its insetting field-pieces, $a$, $a'$, the whole structure being permanently magnetized, and B is a soft iron core mounted between the field-pieces and supported and centered in the fields by keepers C (C') of brass or other suitable diamagnetic material, inserted or entered, as shown, between the field-pieces, and held in place and against said field-pieces or magnets by tie-plates D, D', but otherwise not penetratively attached to the latter by screws, bolts or the like, the tie-plates being secured to the exposed ends of the keepers and serving as a means for attachment of the instrument to the back-board X, and for supporting the scale or dial $d$, respectively as shown, and also, in the case of integrally laminated magnets and field-pieces, for holding the laminations together. Non-magnetic caps E, are confined to plates D, D' by screws or in any other suitable manner, and completely cover the ends of soft iron core and movable element, as well as the field-pieces, to exclude detrimental matter from settling thereon or being drawn thereto. Both caps, but the outer one especially, are capable of being taken off when it is desired to remove the core and coil for cleaning purposes or for inspection and adjustment. Brass screws $c$ are, or may be, mounted in the keepers to take into the core and rigidly secure it. The double horse-shoe construction insures the poles from springing and thus changing the field space and causing irregularity of action.

Instead of forming magnet and field-pieces in a single unitary block, the device may be formed of unitary laminated plates A A, the plates being laid parallel with the plane of the magnet, as indicated in the section displayed in Fig. 2, the side elevation being, of course, that shown in Fig. 1, or that of Fig. 3, or any other suitable outline. In the form indicated in Fig. 3, being of single horse-shoe outline, to avoid the possibility of the field space being changed by springing of the poles, which is a source of irregularity in this type of instruments, I employ suitable means for locking the poles at a fixed distance apart, for instance I construct the outer core-keeper C' with a yoke-extension F which is clamped over shoulders f on the poles of the magnet, by means of the centering screws c' which pass from said keeper into the core.

The construction, as thus far described, gives a much more powerful magnet than heretofore, with great economy of space, reduced cost and high coefficiency. To further economize in space and simplify examination of parts, I mount the jewels G axially in the ends of the core B, making one or both of the jewels adjustable, as at g, and set the pivots H on coil-frame, or movable element, I to project inwardly and engage these jewels, thus supporting coil I' and coil-frame upon and from the core, with capacity of oscillation or vibration thereabout. This arrangement permits ready removal of core and coil, with the coil in place upon the core and swinging thereon, so that a close inspection may be had and perfect adjustment be secured, and, in connection with the aforesaid non-metallic caps E, protects the parts from dust collecting, clogging or the moving element, and from iron chips which otherwise find their way to the fields, seriously interfering with the proper action of the instrument and destroying its accuracy. This peculiar assemblage of core and coil is obviously capable of beneficial use with magnets and fields of other construction than the specific type hereinabove described. Also the relative arrangement and position of coil-frame pivots and supporting jewels is not essential to the action of the magnets and integral field-pieces of this novel type. Spiral springs K, like hair springs, fastened to the coil-frame at their inner ends and to suitable abutments, such as binding posts, at the outer ends, as in the Weston patent, 392,387, November 6, 1888, convey the current to the coil and act as a directing and controlling force thereto. The coil itself is wound on a metallic frame, preferably aluminum, to obtain a periodic or dead beat effect. The spaces L may receive a suitable resistance when the instrument is used as a volt meter.

Having thus described my invention, what I claim and desire to secure by Letters Patent of the United States is:

1. The combination with a permanent magnet having insetting field-pieces, of a soft iron core mounted axially between said field-pieces, brass keepers supporting and centering said core, tie plates holding said keepers from displacement, a back-board to which one of said plates is attached, and a current transmitting coil and coil-frame pivotally connected with the core, axially thereof.

2. The combination with a permanent magnet having insetting field-pieces integral therewith and all formed without joints or perforations, of a soft iron core mounted axially between said field-pieces, an oscillatory coil and coil frame hung upon said core, to oscillate thereon, brass keepers supporting and centering said core, and tie plates attached to the ends of said keepers to tie them together and prevent them from moving or springing apart.

3. The combination with a permanent magnet having insetting field-pieces integral therewith and all formed of integral laminated plates, of a soft iron core mounted axially between said field-pieces, brass keepers supporting and centering said core, and tie plates attached to the ends of said keepers to hold the laminations together and prevent the keepers from moving.

4. The combination with a permanent magnet having insetting field-pieces, of a soft iron core mounted axially between said field-pieces, brass keepers supporting and centering said core, tie plates tying said keepers together and holding them from moving, an oscillatory current transmitting coil and coil-frame axially pivoted to the core, and non-magnetic caps secured to said tie plates and covering and shielding the core, coil and field-pieces.

5. The combination with a permanent magnet having insetting field-pieces integral therewith and all formed of integral laminated plates, of a soft iron core mounted axially between said field-pieces keepers supporting and centering the core, tie plates binding the laminations together and holding said keepers from moving, a current transmitting coil with coil-frame axially hung upon the core, and non-magnetic caps secured to said tie plates and covering and shielding the core, coil and field-pieces.

6. A permanent magnet with integral insetting field-pieces provided with shoulders, combined with a yoke clamped over said shoulders to prevent springing of the field-pieces, and means for clamping said yoke in position.

7. A permanent magnet having integral insetting field-pieces provided with shoulders, combined with a soft iron core supported between said field-pieces, brass keepers supporting and centering said core, means for tieing said keepers together, and a yoke attached to the outer keeper and clamped over the aforesaid shoulders thereby.

ALFRED LOEWENBERG.

Witnesses:
  MAX GREENBERGER,
  FRANK KRAEMER.